(12) United States Patent
Goodzeit et al.

(10) Patent No.: US 6,883,757 B2
(45) Date of Patent: Apr. 26, 2005

(54) SYSTEM AND METHOD FOR INCREASING THE ROLL OFFSET OPERATING RANGE FOR A SPACECRAFT

(75) Inventors: Neil Evan Goodzeit, Princeton, NJ (US); Santosh Ratan, Highland Park, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 53 days.

(21) Appl. No.: 10/681,532

(22) Filed: Oct. 8, 2003

(65) Prior Publication Data

US 2004/0140400 A1 Jul. 22, 2004

Related U.S. Application Data

(60) Provisional application No. 60/417,225, filed on Oct. 9, 2002.

(51) Int. Cl.[7] .............................. B64G 1/26; B64G 1/28
(52) U.S. Cl. ....................... 244/165; 244/169; 244/171; 701/13
(58) Field of Search ................................ 244/164, 165, 244/169, 171; 701/4, 13

(56) References Cited

U.S. PATENT DOCUMENTS

| | | | | |
|---|---|---|---|---|
| 5,452,077 A | * | 9/1995 | Green ................... | 356/139.01 |
| 5,816,540 A | * | 10/1998 | Murphy et al. ............ | 244/173 |
| 5,922,033 A | * | 7/1999 | Milford et al. ............ | 701/13 |
| 6,317,660 B1 | * | 11/2001 | Barker et al. .............. | 701/13 |
| 6,499,699 B1 | * | 12/2002 | Salenc et al. ............. | 244/165 |
| 6,672,544 B2 | * | 1/2004 | McGovern et al. ......... | 244/171 |

* cited by examiner

*Primary Examiner*—Robert P. Swiatek
(74) *Attorney, Agent, or Firm*—McDermott Will & Emery LLP (57) ABSTRACT

A method for increasing the roll offset operating range for a spacecraft using an earth sensor operating in single scan mode includes the steps of moving the spacecraft to a first roll position, which has a roll angle that will cause the earth sensor to have a desired standard chord, switching the earth sensor to single scan mode by deselecting one of the earth sensor scans, whereby switching the earth sensor to a single scan mode, the earth sensor standard chord is locked at or near the desired standard chord. After the desired standard chord is set, the spacecraft is moved to a second roll position, which is a desired roll offset operating position for the spacecraft, and the earth sensor roll output (generated by using the single scan mode) is used to calculate the spacecraft roll at the roll offset operating position.

33 Claims, 5 Drawing Sheets

SYSTEM AND METHOD FOR INCREASING THE ROLL OFFSET OPERATING RANGE FOR A SPACECRAFT

CROSS-REFERENCES TO RELATED APPLICATIONS

This application claims the benefit of U.S. Provisional Application No. 60/417,225, filed on Oct. 9, 2002, and entitled "Single Chord Large Offset Pointing System (SiCLOPS), the entirety of which is incorporated herein by reference for all purposes.

BACKGROUND OF THE INVENTION

The present invention relates generally to spacecraft attitude control, and more particularly to increasing the roll offset operating range of a spacecraft.

Geosynchronous communications spacecraft typically use earth sensors to provide attitude information necessary for earth-pointing control. The advantage of using earth sensors is that they are simple and reliable devices that provide a direct measurement of the spacecraft attitude relative to the Earth. The drawback is that they have a limited sensing range, in part due to the small angular earth radius (8.7 degrees) at geosynchronous altitude. In particular, the scanning earth sensor used by most spacecraft manufacturers has a pitch range of about ±5.1 degrees, and a roll range of roughly ±2.4 degrees.

When a spacecraft is constructed, the earth sensor is mounted so that the sensor operates well within its range during normal mission operations. The difficulty occurs when a spacecraft already in-orbit is to be used for another mission. In this case, it may be necessary to tilt the spacecraft to move the antenna coverage pattern to a new geographical location. The limited roll sensing range, however, may make it impossible to achieve the required tilt. That is, tilting the spacecraft by the desired angle, may saturate the earth sensor so that it is inoperable at the new position. Thus, what is needed is a system and method that will allow the spacecraft and the earth sensor to operate at a roll offset.

BRIEF SUMMARY OF THE INVENTION

One embodiment of the present invention relates to a method for increasing the roll offset operating range for a spacecraft using an earth sensor operating in a single scan mode. In accordance with this embodiment, the method comprises moving the spacecraft to a first roll position, which has a roll angle that will cause the earth sensor to have a desired standard chord. Next, the earth sensor is switched to single scan mode by turning-off or deselecting one of the earth sensor scans. By switching the earth sensor to a single scan mode, the earth sensor standard chord is locked at or near the desired standard chord. After the desired standard chord is set, the spacecraft is moved to a second roll position, which is a desired roll offset operating position for the spacecraft. Finally, the earth sensor roll output (generated using the single scan mode) is used to calculate the spacecraft roll at the roll offset operating position.

In one embodiment of the present invention, when operating in single scan mode, the earth sensor comprises an active scan and an inactive scan, and the step of moving the spacecraft to a first roll position, comprises moving the spacecraft to a roll position so that the earth sensor standard chord is equal to or about equal to the chord width for the active scan at the desired roll offset operating position.

In accordance with another embodiment of the invention, the earth sensor comprises a north scan and a south scan, and the step of switching the earth sensor to single scan mode comprises deselecting the south scan for a positive roll offset operation and deselecting the north scan for a negative roll offset operation.

In accordance with yet another embodiment of the invention, prior to moving the spacecraft to the second roll position, an estimated standard chord value for the locked standard chord is computed. In some embodiments, the estimated standard chord value $\hat{N}_0$ is calculated using the equation:

$$\hat{N}_0 = \cos^{-1}\left[\frac{\cos(\theta_e) + \sin(\theta_{cant})\sin(2\hat{\phi})}{\cos(\theta_{cant})\cos(\hat{\phi})}\right] + \cos^{-1}\left[\frac{\cos(\theta_e) - \sin(\theta_{cant})\sin(2\hat{\phi})}{\cos(\theta_{cant})\cos(\hat{\phi})}\right].$$

In yet another embodiment of the present invention, the spacecraft roll is calculated using the polynomial equation: $\phi = a_0 + a_1\hat{\theta}_s + a_2\hat{\theta}_s^2 + \ldots + a_N\hat{\theta}_s^N$. In accordance with this aspect of the invention, the coefficients $a_0, a_1, \ldots, a_N$ are computed by fitting an $N^{th}$ degree polynomial to numerical values of the true earth sensor roll angle for a range of single scan chord widths. Further, in some embodiments, the value for $\hat{\theta}_s$ may be determined by the equation: $\hat{\theta}_s = \phi_{ESA} + \hat{N}_0 + N_{bias}$, where $N_{bias}$ is a standard chord bias computed to correct for uncertainty in the value of the earth sensor's internal standard chord.

In accordance with yet another embodiment of the present invention, the step of using the earth sensor roll output to calculate spacecraft roll at the roll offset operating position may further comprise correcting the roll angle for seasonal radiance biases and thermal distortions.

Other embodiments of the present invention comprise an attitude processing control system adapted to allow a spacecraft to perform missions, which require spacecraft roll outside the normal roll operating range of a spacecraft earth sensor. In accordance with this embodiment of the invention, the attitude processing and control system comprises an earth sensor, control torquers, and at least one processing unit adapted to receive attitude information from the earth sensor, compute attitude, and compute attitude control commands which direct the control torquers to move the spacecraft to maintain a desired attitude.

The attitude processing and control system is adapted to move the spacecraft to a first roll position, which has a roll angle that will cause the earth sensor to have a desired standard chord. Next, the attitude processing and control system is adapted to switch the earth sensor to single scan mode by deselecting one of the earth sensor scans. This locks the earth sensor standard chord at or near the desired standard chord. Next, the attitude processing and control system is adapted to move the spacecraft to a second roll position, which is a desired roll offset operating position for the spacecraft. Finally, the attitude processing and control system is adapted to calculate spacecraft roll at the roll offset operating position using the earth sensor roll output in single scan mode. The calculated spacecraft roll then can be used to control or maintain a desired roll attitude for the spacecraft.

Yet another embodiment of the present invention comprises a spacecraft that includes the systems and methods described herein.

A more complete understanding of the present invention may be derived by referring to the detailed description of preferred embodiments and claims when considered in connection with the figures.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION OF THE INVENTION

The present invention relates generally to spacecraft attitude control. More particularly, one embodiment of the invention relates to increasing the roll offset operating range of a spacecraft by overcoming the limitations of the standard earth sensor to extend the roll sensing range beyond the normal earth sensor roll output saturation limit. In accordance with this embodiment and as discussed in more detail below, a single scan mode of the earth sensor is used to generate the roll output angle, rather than the two scans of information normally used.

The method comprises a procedure that involves commanding a large roll offset and then switching the earth sensor from dual scan mode to single scan mode. Once the procedure is completed, the earth sensor operates using the single scan mode to provide roll information beyond the normal earth sensor roll range limit. When operated is this manner, the earth sensor roll output is a nonlinear function of the true earth sensor roll angle. Thus, in-flight software applies an inverse function to the earth sensor roll output to estimate the true spacecraft roll angle from the measured earth sensor roll angle. Once determined, the spacecraft attitude control system can use the estimated roll angle in the normal way to update the spacecraft three-axis inertial attitude and gyro biases. As one skilled in the art will appreciate, the true roll angle of the spacecraft is not necessarily the same as the true roll angle of the earth sensor. If the axes of the two are aligned, they will be about the same, otherwise they will not. Regardless, because the relationship between the spacecraft and the earth sensor generally is known, it is relatively straight forward to calculate spacecraft roll from the earth sensor roll.

Figure 1:
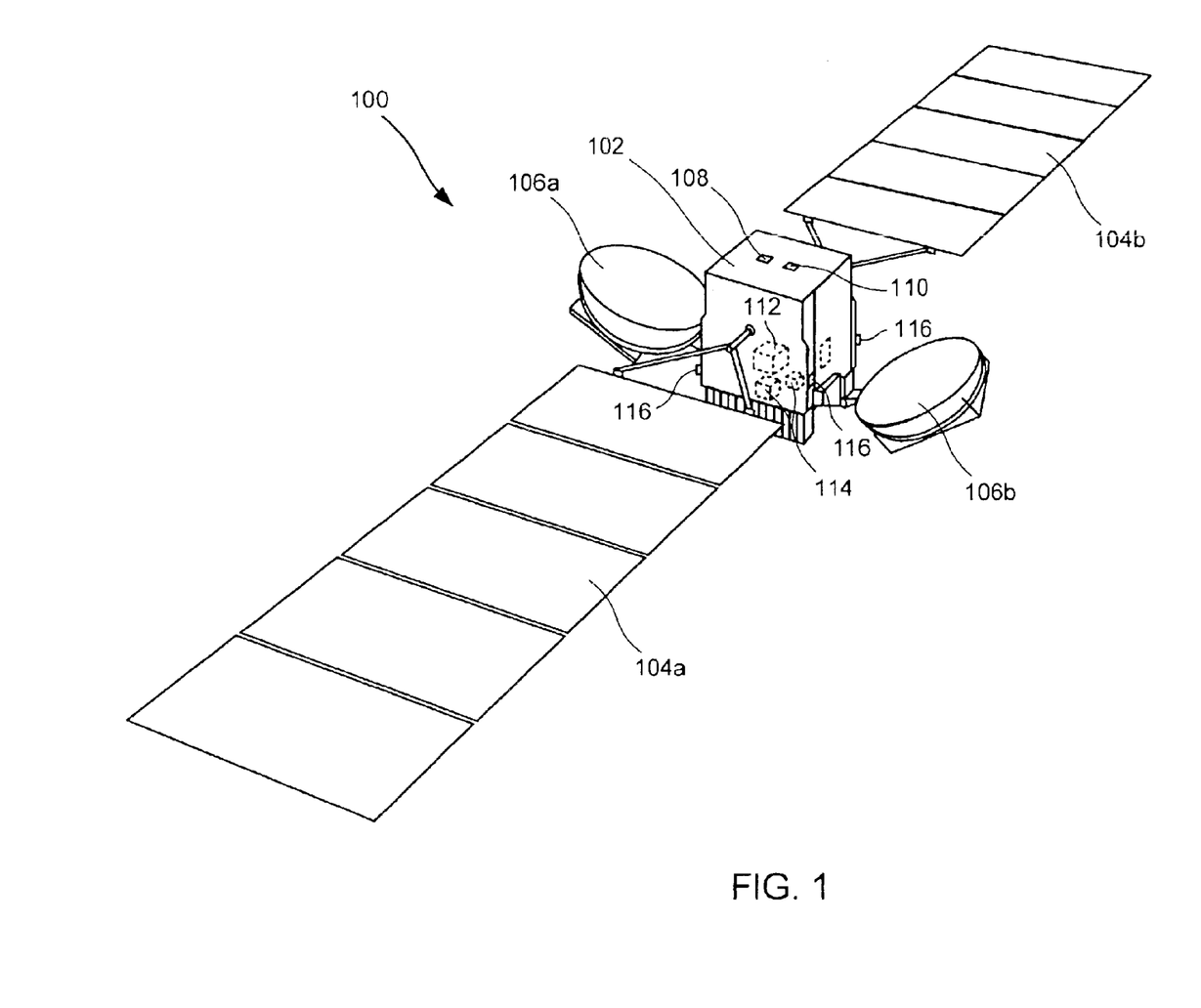
FIG. 1 is a drawing of one embodiment of a spacecraft that may include the systems and methods of the present invention.

Referring now to FIG. 1, one embodiment of a spacecraft 100 that may include the systems and methods for increasing the roll offset operating range of the spacecraft in accordance with the present invention is shown. In the illustrated embodiment, spacecraft 100 includes a spacecraft center body 102, and solar panels 104a and 104b and communication antennas 106a and 106b connected to spacecraft center body 102. In addition, spacecraft 100 includes an attitude control systems that may comprise attitude sensors, control torquers and a processing system. For example, in the embodiment illustrated in FIG. 1, the attitude control system includes an earth sensor 108, a sun sensor 110, an inertial measurement unit (e.g., a gyro) 112, reaction wheels 114, and thrusters 116. As one skilled in the art will appreciate, the sensors (earth sensor 108, sun sensor 110 and IMU 112) are adapted to monitor the attitude of the spacecraft, and the control troquers (reaction wheels 114 and thrusters 116) are adapted to rotate the spacecraft to maintain a desired attitude. Also, as one skilled in the art will appreciate, the spacecraft illustrated in FIG. 1 is but one example of a spacecraft that may embody the systems and methods of the present invention. Therefore, the present invention is not limited to the illustrated embodiment. One skilled in the art will appreciate that the systems and methods of the present invention can be used on any spacecraft configuration and for any spacecraft mission.

Figure 2:
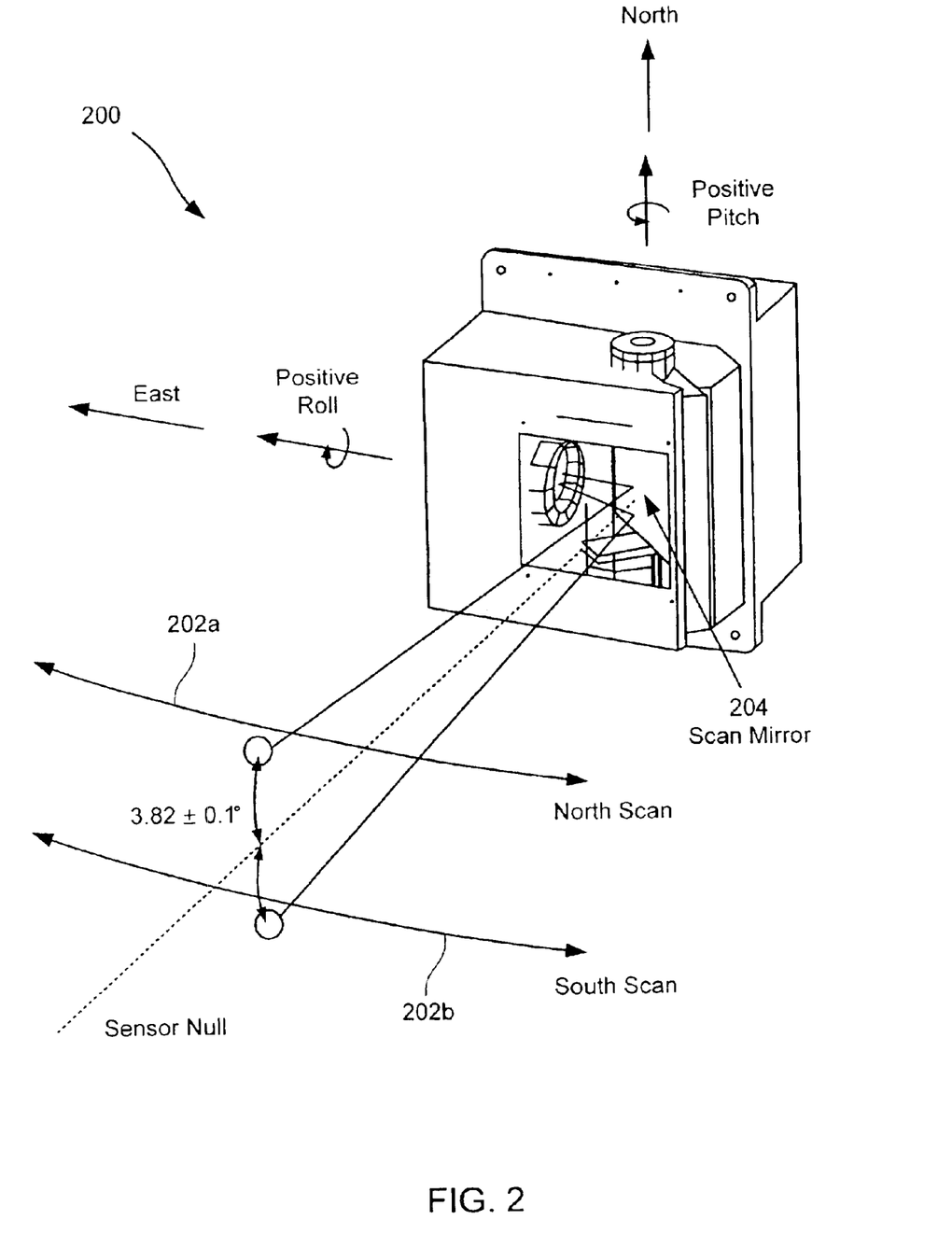
FIG. 2 is a drawing of one embodiment of an earth sensor.

Geosynchronous spacecraft often use a scanning earth sensor, (e.g., earth sensor 200 shown in FIG. 2) to provide information used to determine both roll and pitch attitudes for the spacecraft. This type of earth sensor typically includes two pyro-electric detectors (not shown) and a mirror 204 mounted on a flexure. As shown in FIG. 2, mirror 204 oscillates back and forth at a fixed frequency and causes the earth's infrared image to translate back and forth across the detectors. Alternatively, this can be viewed as the detectors translating back and forth across the earth's image. In FIG. 2, the generated detector scans are illustrated as scans 202a and 202b. The two scans, a north scan 202a and a south scan 202b, traverse an east-west path as shown in FIG. 2. With the particular earth sensor embodiment illustrated in FIG. 2, the two scans are roughly 7.6 degrees apart, and the total scan angle is roughly ±15 degrees.

Earth sensor 200 may operate either in a dual scan mode or in a single scan mode. In the dual scan mode, information from both scans 202a and 202b is used to determine the roll and pitch angle of the spacecraft. In the single can mode, information from either the north scan 202a or the south scan 202b is used. The single scan mode is intended for use when the sun or a bright moon may corrupt the output of one of the scans. During single scan mode operation, the corrupted scan is deselected or "inhibited" by ground command so that the sensor output is not corrupted. Although it is possible to operate continuously in the single scan mode, in some instances, it is not preferred because of reduced sensing accuracy.

Earth sensor 200 processes the scans from the detectors and computes chord widths and chord centers for the scans; i.e., the width of the earth at the scan location, and the center of the earth width at that location relative to the scan center point. The chord centers are used to determine pitch angle, and the chord widths are used to determine the roll angle. In the dual scan mode, the roll angle generated by the earth sensor is computed as:

$$\phi_{ESA} = \frac{\theta_s - \theta_n}{2} \quad (1)$$

where $\theta_s$ is the south scan chord angle, and $\theta_n$ is the north scan chord angle.

When the earth sensor is operating in the dual scan mode, the output reaches its saturation limit of about ±2.56 degrees when the true earth sensor roll angle reaches about ±2.46 degrees.

In the single scan mode, the earth sensor processing depends on the selected scan. When the south scan is selected, the roll angle output is given by:

$$\phi_{ESA} = \theta_s - N_0 \quad (2)$$

where $N_0$ is the standard chord angle; a quantity that the earth sensor computes internally from the north and south scan chord measurements. When the north scan is selected, the roll angle output is given by:

$$\phi_{ESA} = N_0 - \theta_n \quad (3)$$

While operating in dual scan mode, the earth sensor updates the standard chord $N_0$ every eight (8) seconds by processing 128 samples of the north and south chord widths according to the equation:

$$N_0 = \sum_{i=1}^{128} \frac{\theta_{s_i} + \theta_{n_i}}{2} \quad (4)$$

When the earth sensor is switched from the dual scan mode to the single scan mode the then present value of the standard chord is "locked-in" and does not change during single scan operation. For the earth sensor as described, the value of the standard chord locked-in at a zero degree roll angle is approximately 15.7 degrees. Using this standard chord, and with the south scan selected, the earth sensor roll output saturates when the true earth sensor roll angle reaches about −1.93 degrees. With the north scan selected, the output saturates at a roll angle of about +1.93 degrees.

The present invention achieves an increased roll sensing range by making use of Eqs. (2) and (3), and recognizing from Eq. (4) that the value of the standard chord depends on the roll angle at which the standard chord is locked. More specifically, the difference between the selected scan chord (e.g., either the north scan chord or the south scan chord) and the standard chord determines whether or not the earth sensor output will be saturated. As long as the magnitude of this difference is less than 2.56 degrees, then the output will not be saturated, and the sensor will produce useful roll information.

Figure 3:
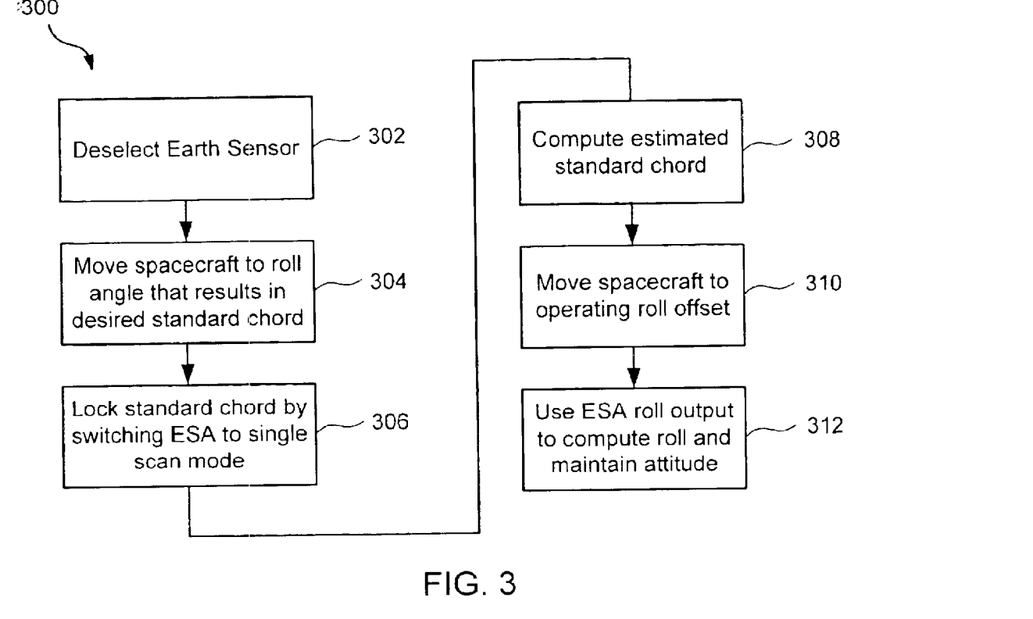
FIG. 3 is a flow chart illustrating one embodiment of a method for increasing the roll offset operating range of a spacecraft.

Referring now to FIG. 3, one embodiment of a method for increasing the roll offset operating range of a spacecraft will be described with reference to flow chart 300. In accordance with this particular embodiment, the earth sensor is deselected for attitude determination, and the spacecraft operates using a gyro-propagated reference without roll updates from the earth sensor (step 302). This gyro-propagated reference is accurately established using updates from the earth sensor in dual-scan mode prior to the start of the roll offset method of the present invention.

Next, using the gyro measurements to measure the spacecraft roll, the spacecraft is moved to a roll angle that results in a desired standard chord (step 304). That is, the spacecraft is oriented to a roll angle that will allow the standard chord to be locked-in at a chord width that is approximately equal to the chord width of the selected scan at the desired roll offset operating point. By doing this, the earth sensor is "tricked" into believing that the desired roll offset operating point is the zero-roll operating point. One example of this is illustrated by chart 400 in FIG. 4.

Figure 4:
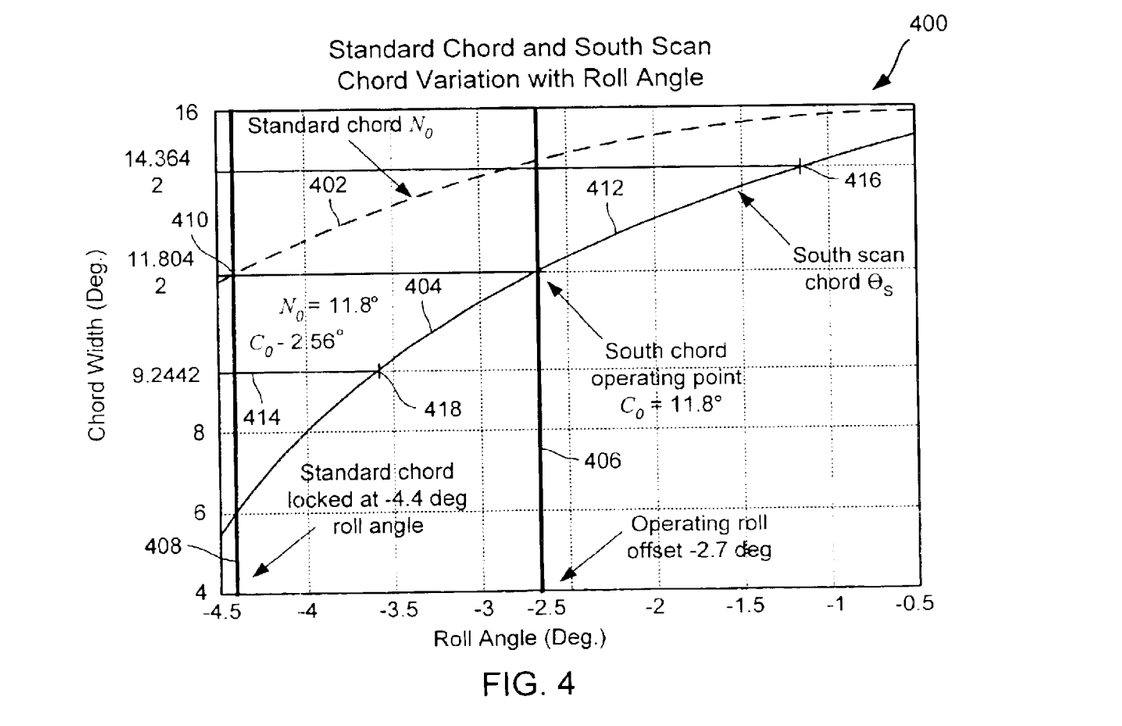
FIG. 4 is a chart showing how the standard chord and the south scan chord for an earth sensor may vary with roll angle for one example of an implementation of the present invention.

FIG. 4 shows how the standard chord (depicted as curve 402) and the selected scan chord (depicted as curve 404) vary as a function of the true earth sensor roll angle (the X-axis of the chart). In this particular example, a negative roll offset is considered, and the south scan is selected (conversely, for a positive roll offset, the north scan would be selected). Note that for a negative roll offset, the north scan moves towards the equator as the south scan moves towards the south pole. This is illustrated in FIGS. 5a and 5b.

Figure 5A:
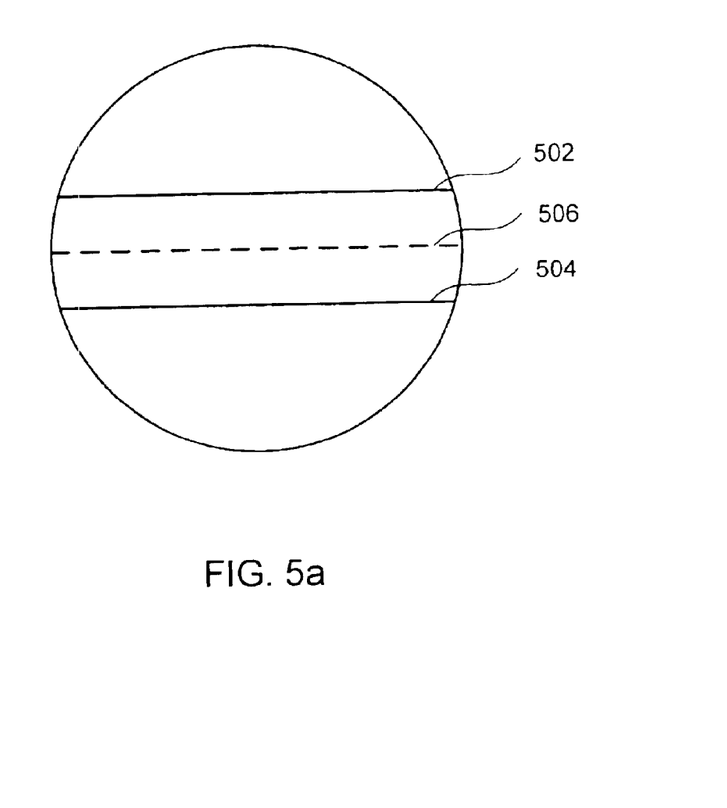
FIG. 5a is a drawing showing north and south earth sensor chords for a spacecraft having its earth sensor pointing at nadir.
Figure 5B:
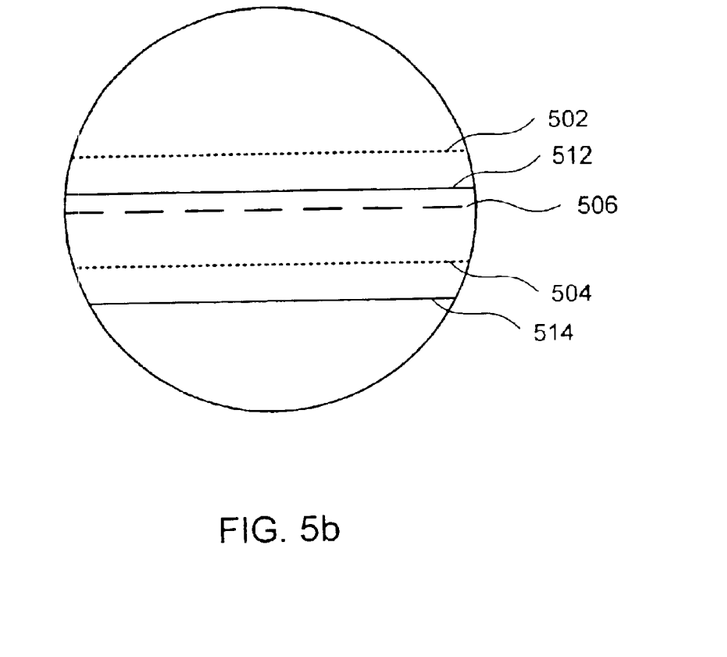
FIG. 5b is a drawing showing north and south earth sensor chords for a spacecraft operating in a mission in which the spacecraft is rolled so that the earth sensor is not pointing at nadir.

FIG. 5a shows a north scan chord 502 and a south scan chord 504 for an earth sensor that is pointing at nadir. In this embodiment, the standard chord 506 is the average of the north and south scan chords, and for zero roll, is the chord equal to both the values of 502 and 504. FIG. 5b shows the scan chords for a negative roll of the spacecraft. As can be seen, the north scan has moved from it original position 502 to a new position 512 toward the equator 506. Similarly, the south scan chord has moved from its original position 504 to a new position 514, which is closer to the south pole. The standard chord for the negative roll measurement is the average of the new north scan chord 512 and the new south scan chord 514.

In the example illustrated in FIG. 4, a desired roll offset of −2.7 degrees is assumed (line 406). At this operating point, the south chord is 11.8 degrees (denoted as point $C_O$ on curve 404). To achieve this same chord width value for the standard chord, the standard chord must be locked in at a roll angle of −4.4 degrees (line 408). The standard chord length at a −4.4 roll angle is shown as point 410 on curve 402. By locking the standard chord at −4.4 degrees and having the operating offset angle at −2.7 degrees, then the earth sensor output will be non-saturated for south chord widths within the range of about 9.2 to about 14.4 degrees, where the magnitude of the difference between the south chord and the standard chord will be less than 2.56 degrees. In the illustrated embodiment, the operating range is between lines 412 and 414 in FIG. 4. As Shown in FIG. 4, with the single scan mode configured in this fashion, the earth sensor will provide usable roll information within the range of about −1.2 degrees (point 416) to about −3.6 degrees (point 418).

In accordance with these embodiments of the present invention, for a negative roll, the south scan is selected (and the north scan is inhibited) because it provides better sensitivity to changes in roll angle, and reduced sensitivity due to measurement errors. The north scan is not used because it has reduced sensitivity to roll angle and provides increased sensitivity to measurement errors. For example, for the case of a −2.7 degree earth sensor roll angle, the north chord sensitivity is 0.27 (ratio of delta chord width to delta roll angle), while the south chord sensitivity is 2.13.

As mentioned above, after the spacecraft is moved to the roll angle that results in the desired standard chord, the standard chord is "locked-in" by switching the earth sensor to its single scan mode (step 306). When this mode switch occurs, the flight software computes an estimated standard chord $\hat{N}_0$ assuming a spherical earth model (step 308). In accordance with one embodiment of the invention, the estimated standard chord $\hat{N}_0$ is computed using the following expression:

$$\hat{N}_0 = \cos^{-1}\left[\frac{\cos(\theta_e) + \sin(\theta_{cant})\sin(2\hat{\phi})}{\cos(\theta_{cant})\cos(\hat{\phi})}\right] + \cos^{-1}\left[\frac{\cos(\theta_e) - \sin(\theta_{cant})\sin(2\hat{\phi})}{\cos(\theta_{cant})\cos(\hat{\phi})}\right] \quad (5)$$

where $\theta_e$ is the earth $CO_2$ angular radius at geosynchronous altitude (roughly 8.7 degrees), $\theta_{cant}$ is the earth sensor scan cant angle (3.8 degrees), and $\hat{\phi}$ is the expected value of the earth sensor roll angle provided by an on-board attitude determination system.

Figure 6:
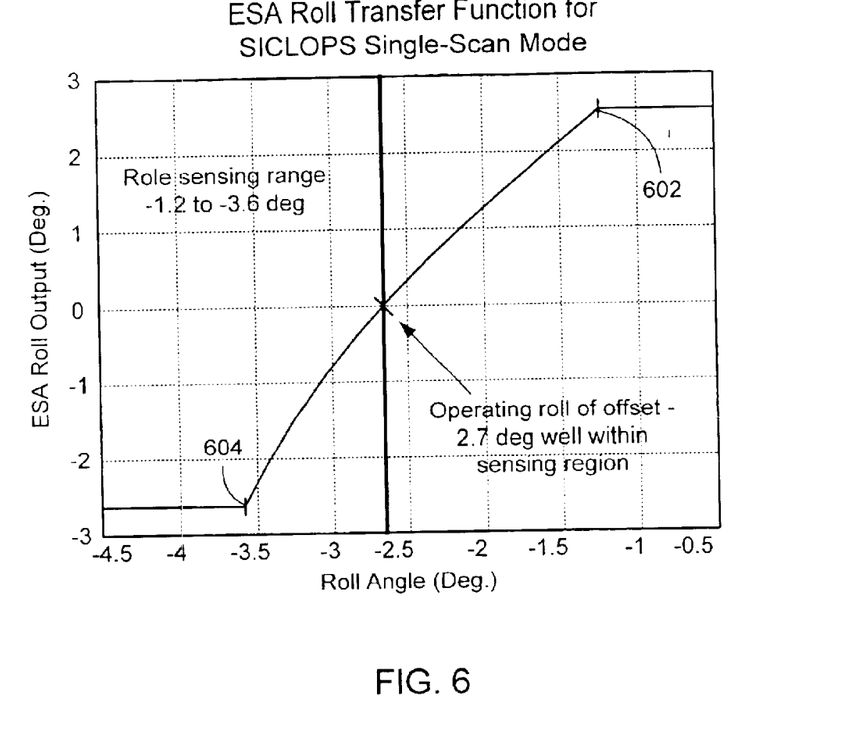
FIG. 6 is a chart showing the earth sensor roll output for one example of an implementation of the present invention.

After the standard chord is estimated, the spacecraft is rolled-back to its smaller operating roll offset (step 310). For the example illustrated in FIG. 4, the operating roll offset is −2.7 degrees. With the earth sensor now operating in single scan mode, the earth sensor roll output $\phi$ is computed and used to maintain the spacecraft attitude (step 312). In one embodiment of the invention, the earth sensor roll output $\phi$ is computed using a polynomial equation, for example, of the form:

$$\phi = a_0 + a_1\hat{\theta}_s + a_2\hat{\theta}_s^2 + \ldots + a_N\hat{\theta}_s^N \quad (6)$$

where $\hat{\theta}_s$ is the expected selected scan chord width (south scan for a negative roll offset) given by:

$$\hat{\theta}_s = \phi_{ESA} + \hat{N}_0 + N_{bias} \quad (7)$$

where $N_{bias}$ is a standard chord bias computed to correct for uncertainty in the value of the earth sensor's internal standard chord. Equation (6) provides an approximation to the inverse of the earth sensor single chord transfer function. The coefficients $a_0, a_1, \ldots, a_N$ are computed by fitting an $N^{th}$ degree polynomial to numerical values of the true earth sensor roll angle for a range of single scan chord widths. In one embodiment, a $5^{th}$ degree polynomial should be sufficient to provide good modeling accuracy over the earth sensor operating range. FIG. 6 illustrates a curve 600 showing the earth sensor transfer function for an operating offset roll angle of −2.7 degrees. As shown, the transfer function is a non-linear curve having an operating range between about −1.2 degrees (location 602) and about −3.6 degrees (location 604), for this particular example. Outside of this range, the earth sensor saturates, and thus, will not produce a useful roll output measurement.

Figure 7:
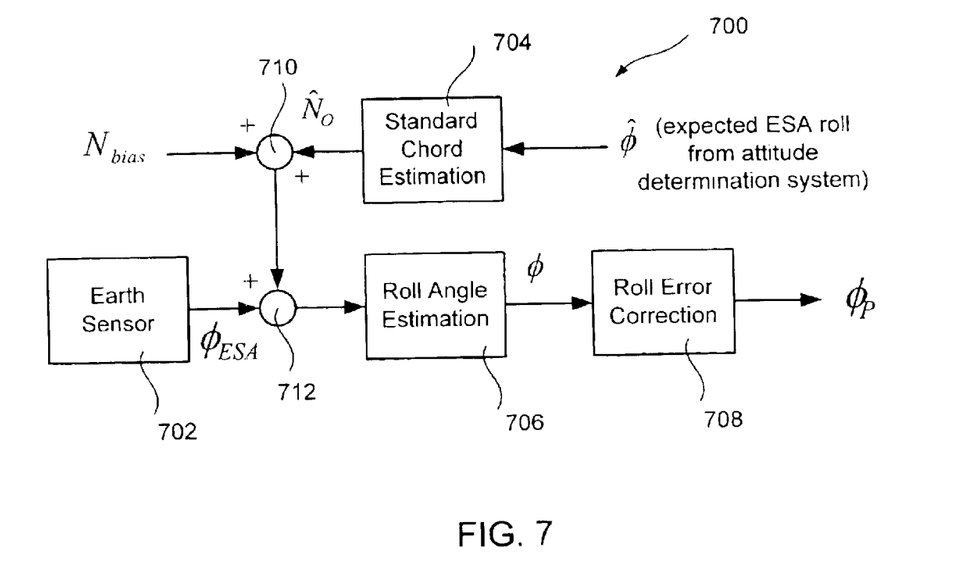
FIG. 7 is a diagram of one embodiment of a system that may be used for increasing the roll offset operating range of a spacecraft.

Referring now to FIG. 7, one embodiment of a system 700 that may be used to implement the methods of the present invention is shown. System 700 comprises an earth sensor 702, a standard chord estimation unit 702, a roll angle estimation unit 704, and a roll error correction unit 706. In the illustrated embodiment, standard chord estimation unit 702, roll angle estimation unit 704, and roll error correction unit 706 are illustrated as separate units. These are merely process representations and are not intended to limit the present invention to this particular configuration. One skilled in the art will appreciate that each of these process representations or units can be incorporated into one or multiple processing units that are part of an attitude control system. Thus, the present invention is not limited to the particular block diagram shown in FIG. 7.

In accordance with the illustrated embodiment, earth sensor 702 generates an earth sensor roll measurement $\phi_{ESA}$.

Standard chord estimation unit 704 uses the expected earth sensor roll $\hat{\phi}$ from an attitude determination system to calculate an estimated standard chord $\hat{N}_o$, for example, in accordance with Equation 5 above. As mentioned above, a standard chord bias $N_{bias}$ is then computed so that the estimated single scan chord equals the expected single scan chord at the operating offset. The estimated standard chord $\hat{N}_0$ and the standard chord bias $N_{bias}$ are added to the earth sensor output $\phi_{ESA}$ to generate the expected scan chord width $\hat{\theta}_s$, for example, in accordance with Equation 7. In FIG. 7, this addition process is shown as addition operations 710 and 712, which is merely an exemplary representation of Equation 7.

After the expected scan chord width $\hat{\theta}_s$ is calculated, it is used by roll angle estimation unit 706 to calculate the estimated spacecraft roll angle $\phi$, for example, in accordance with Equation 6. Roll error correction unit 708 receives the estimated spacecraft roll angle $\phi$, and corrects the roll angle for other factors, such as seasonal radiance biases, thermal distortions, etc. The coefficients of a seasonal model (and refinements to the value $N_{bias}$) may be determined using digital sun sensor measurements, thermal sensor measurements, structural bias sensor measurements, or the like.

In conclusion, the present invention provides novel systems and methods for increasing the roll offset operating range for a spacecraft. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for increasing the roll offset operating range for a spacecraft using an earth sensor operating in either a dual scan mode or operating in a single scan mode which has at least two earth sensor scans, comprising the steps of:
    moving the spacecraft to a first roll position, the first roll position having a roll angle that will cause the earth sensor to have a desired standard chord;
    switching the earth sensor to a single scan mode by deselecting one of the earth sensor scans, which locks the earth sensor standard chord at or near the desired standard chord;
    moving the spacecraft to a second roll position, which is a desired roll offset operating position for the spacecraft; and
    using an earth sensor roll output to calculate spacecraft roll at the roll offset operating position.

2. The method as recited in claim 1, wherein when operating in single scan mode, the earth sensor comprises an active scan and an inactive scan, and wherein the step of moving the spacecraft to a first roll position, comprises moving the spacecraft to a roll position so that the earth sensor standard chord is equal to or about equal to the chord width for the active scan at the desired roll offset operating position.

3. The method as recited in claim 1, wherein the earth sensor comprises a north scan and a south scan, and wherein the step of switching the earth sensor to single scan mode comprises deselecting the south scan for a positive roll offset operation and deselecting the north scan for a negative roll offset operation.

4. The method as recited in claim 1, wherein prior to the step of moving the spacecraft to the second roll position, the method comprises computing an estimated standard chord value for the locked standard chord.

5. The method as recited in claim 4, wherein the step of computing an estimated standard chord value comprises computing an estimated standard chord value $\hat{N}_0$ using the equation:

$$\hat{N}_0 = \cos^{-1}\left[\frac{\cos(\theta_e) + \sin(\theta_{cant})\sin(2\hat{\phi})}{\cos(\theta_{cant})\cos(\hat{\phi})}\right] + \cos^{-1}\left[\frac{\cos(\theta_e) - \sin(\theta_{cant})\sin(2\hat{\phi})}{\cos(\theta_{cant})\cos(\hat{\phi})}\right].$$

6. The method as recited in claim 1, wherein the step of using the earth sensor to calculate spacecraft roll at the roll offset operating position comprises calculating spacecraft roll using the polynomial equation:

$$\phi = a_0 + a_1\hat{\theta}_s + a_2\hat{\theta}_s^2 + \ldots + a_N\hat{\theta}_s^N.$$

7. The method as recited in claim 6, wherein the coefficients $a_0, a_1, \ldots a_N$ are computed by fitting an $N^{th}$ degree polynomial to numerical values of the true earth sensor roll angle for a range of single scan chord widths.

8. The method as recited in claim 6, wherein $\hat{\theta}_s$ is determined by the equation:

$$\hat{\theta}_s = \phi_{ESA} + \hat{N}_0 + N_{bias},$$

where $N_{bias}$ is a standard chord bias computed to correct for uncertainty in the value of the earth sensor's internal standard chord.

9. The method as recited in claim 1, wherein the step of using the earth sensor roll output to calculate spacecraft roll at the roll offset operating position further comprises correcting the roll angle for seasonal radiance biases and thermal distortions.

10. An attitude processing control system adapted to allow a spacecraft to perform missions which require spacecraft roll outside the normal roll operating range of a spacecraft earth sensor, the attitude processing and control system comprising:

an earth sensor which operates in either a dual scan mode or a single scan mode having at least two earth sensor scans;

control torquers; and at least one processing unit adapted to receive attitude information from the earth sensor, compute attitude, and compute attitude control commands which direct the control torquers to move the spacecraft to maintain a desired attitude;

the attitude processing and control system being adapted to:

move the spacecraft to a first roll position, the first roll position having a roll angle that will cause the earth sensor to have a desired standard chord;

switch the earth sensor to single scan mode by deselecting one of the earth sensor scans, which locks the earth sensor standard chord at or near the desired standard chord;

move the spacecraft to a second roll position, which is a desired roll offset operating position for the spacecraft; and calculate spacecraft roll at the roll offset operating position using an earth sensor roll output.

11. The system as recited in claim 10, wherein the attitude processing and control system is further adapted to control the attitude of the spacecraft using the calculated spacecraft roll at the roll offset operating position.

12. The system as recited in claim 10, wherein the spacecraft control torquers comprise reaction wheels and thrusters.

13. The system as recited in claim 10, wherein the attitude processing and control system further comprises one or more attitude sensors selected from the group consisting of a sun sensor, a star tracker, and an inertial measurement unit.

14. The system as recited in claim 10, wherein when operating in single scan mode, the earth sensor comprises an active scan and an inactive scan, and wherein the attitude processing and control system moves the spacecraft to a first roll position having a roll angle such that the earth sensor standard chord is equal to or about equal to the chord width for the active scan at the desired roll offset operating position.

15. The system as recited in claim 10, wherein the earth sensor comprises a north scan and a south scan, and wherein the attitude processing and control system switches the earth sensor to single scan mode by deselecting the south scan for a positive roll offset operation and deselecting the north scan for a negative roll offset operation.

16. The system as recited in claim 10, wherein prior to moving the spacecraft to the second roll position, the attitude processing and control system computes an estimated standard chord value for the locked standard chord.

17. The system as recited in claim 16, wherein the attitude processing and control system computes the estimated standard chord value $\hat{N}_0$ using the equation:

$$\hat{N}_0 = \cos^{-1}\left[\frac{\cos(\theta_e) + \sin(\theta_{cant})\sin(2\hat{\phi})}{\cos(\theta_{cant})\cos(\hat{\phi})}\right] + \cos^{-1}\left[\frac{\cos(\theta_e) - \sin(\theta_{cant})\sin(2\hat{\phi})}{\cos(\theta_{cant})\cos(\hat{\phi})}\right].$$

18. The system as recited in claim 10, wherein the attitude processing and control system calculates spacecraft roll offset operating position using the polynomial equation:

$$\phi = a_0 + a_1\hat{\theta}_s + a_2\hat{\theta}_s^2 + \ldots + a_N\hat{\theta}_s^N.$$

19. The system as recited in claim 18, wherein the coefficients $a_0, a_1, \ldots, a_N$ are computed by fitting an $N^{th}$ degree polynomial to numerical values of the true earth sensor roll angle for a range of single scan chord widths.

20. The system as recited in claim 18, wherein $\hat{\theta}_s$ is determined by the equation:

$$\hat{\theta}_s = \phi_{ESA} + \hat{N}_0 + N_{bias},$$

where $N_{bias}$ is a standard chord bias computed to correct for uncertainty in the value of the earth sensor's internal standard chord.

21. The system as recited in claim 10, wherein the attitude processing and control system is further adapted to correct the roll angle for seasonal radiance biases and thermal distortions.

22. A spacecraft adapted to perform missions which require spacecraft roll outside the normal roll operating range of a spacecraft earth sensor, the spacecraft comprising:

an attitude processing and control system comprising:

an earth sensor which can operate in either a dual scan mode or a single scan mode having at least two earth sensor scans;

control torquers; and at least one processing unit adapted to receive attitude information from the earth sensor, compute attitude and compute attitude control commands which direct the control torquers to move the spacecraft to maintain a desired attitude;

the attitude processing and control system being adapted to:

move the spacecraft to a first roll position, the first roll position having a roll angle that will cause the earth sensor to have a desired standard chord;

switch the earth sensor to single scan mode by deselecting one of the earth sensor scans, which locks the earth sensor standard chord at or near the desired standard chord;

move the spacecraft to a second roll position, which is a desired roll offset operating position for the spacecraft; and calculate spacecraft roll at the roll offset operating position using an earth sensor roll output.

23. The spacecraft as recited in claim 22, wherein the attitude processing and control system is further adapted to control the attitude of the spacecraft using the calculated spacecraft roll at the roll offset operating position.

24. The spacecraft as recited in claim 22, wherein the spacecraft control torquers comprise reaction wheels and thrusters.

25. The spacecraft as recited in claim 22, wherein the attitude processing and control system further comprises one or more attitude sensors selected from the group consisting of a sun sensor, a star tracker, and an inertial measurement unit.

26. The spacecraft as recited in claim 22, wherein when operating in a single scan mode, the earth sensor comprises an active scan and an inactive scan, and wherein the attitude processing and control system moves the spacecraft to a first roll position having a roll angle such that the earth sensor standard chord is equal to or about equal to the chord width for the active scan at the desired roll offset operating position.

27. The spacecraft as recited in claim 22, wherein the earth sensor comprises a north scan and a south scan, and wherein the attitude processing and control system switches the earth sensor to single scan mode by deselecting the south scan for a positive roll offset operation and deselecting the north scan for a negative roll offset operation.

28. The spacecraft as recited in claim 22, wherein prior to moving the spacecraft to the second roll position, the attitude processing and control system computes an estimated standard chord value for the locked standard chord.

29. The spacecraft as recited in claim 28, wherein the attitude processing and control system computes the estimated standard chord value $\hat{N}_0$ using the equation:

$$\hat{N}_0 = \cos^{-1}\left[\frac{\cos(\theta_e) + \sin(\theta_{cant})\sin(2\hat{\phi})}{\cos(\theta_{cant})\cos(\hat{\phi})}\right] + \cos^{-1}\left[\frac{\cos(\theta_e) - \sin(\theta_{cant})\sin(2\hat{\phi})}{\cos(\theta_{cant})\cos(\hat{\phi})}\right].$$

30. The spacecraft as recited in claim 22, wherein the attitude processing and control system calculates spacecraft roll at the roll offset operating position using the polynomial equation:

$$\phi = a_0 + a_1\hat{\theta}_s + a_2\hat{\theta}_s^2 + \ldots + a_N\hat{\theta}_s^N.$$

31. The spacecraft as recited in claim 30, wherein the coefficients $a_0, a_1, \ldots, a_N$ are computed by fitting an $N^{th}$ degree polynomial to numerical values of the true earth sensor roll angle for a range of single scan chord widths.

32. The spacecraft as recited in claim 30, wherein $\hat{\theta}_s$ is determined by the equation:

$$\hat{\theta}_s = \phi_{ESA} + \hat{N}_0 + N_{bias},$$

where $N_{bias}$ is a standard chord bias computed to correct for uncertainty in the value of the earth sensor's internal standard chord.

33. The spacecraft as recited in claim 22, wherein the attitude processing and control system is further adapted to correct the roll angle for seasonal radiance biases and thermal distortions.

* * * * *